(12) United States Patent
Albou et al.

(10) Patent No.: US 12,455,343 B2
(45) Date of Patent: Oct. 28, 2025

(54) VEHICLE ASSEMBLY COMPRISING A RADAR SENSOR AND AN ARRANGEMENT OF LAYERS FORMING A LOGO

(71) Applicant: VALEO VISION, Bobigny (FR)

(72) Inventors: Pierre Albou, Bobigny (FR); Pierre Renaud, Bobigny (FR)

(73) Assignee: Valeo Vision, Bigny (FR)

( * ) Notice: Subject to any disclaimer, the term of this patent is extended or adjusted under 35 U.S.C. 154(b) by 251 days.

(21) Appl. No.: 18/254,309

(22) PCT Filed: Nov. 17, 2021

(86) PCT No.: PCT/EP2021/082047
§ 371 (c)(1),
(2) Date: May 24, 2023

(87) PCT Pub. No.: WO2022/117348
PCT Pub. Date: Jun. 9, 2022

(65) Prior Publication Data
US 2024/0012098 A1    Jan. 11, 2024

(30) Foreign Application Priority Data
Dec. 1, 2020   (FR) ...................................... 2012488

(51) Int. Cl.
*G01S 7/02*     (2006.01)
*G01S 13/931*   (2020.01)

(52) U.S. Cl.
CPC ............ *G01S 7/028* (2021.05); *G01S 13/931* (2013.01); *G01S 2013/93271* (2020.01)

(58) Field of Classification Search
CPC ................... G01S 7/028; G01S 13/931; G01S 2013/93271; G01S 7/027;
(Continued)

(56) References Cited

U.S. PATENT DOCUMENTS 10,754,026 B2    8/2020  Callewaert
2007/0210979 A1*  9/2007  Shingyoji ............ H01Q 17/001
                                                    343/711
(Continued)

FOREIGN PATENT DOCUMENTS

DE   102011115829 A1   4/2013
EP       2573872 A1    3/2013
EP       3644087 A1    4/2020

OTHER PUBLICATIONS

European Patent Office, International Search Report (with English translation) and Written Opinion of corresponding International Application No. PCT/EP2021/082047, dated Feb. 24, 2022.

*Primary Examiner* — Bernarr E Gregory
*Assistant Examiner* — Naomi M Wolford
(74) *Attorney, Agent, or Firm* — Valeo Vision

(57) ABSTRACT

A vehicle assembly including a radar sensor configured to emit radar waves over a range of wavelengths with an arrangement of layers placed opposite the radar sensor, including a first subset of layers configured to perform an optical function, each layer having a refractive index and a thickness, and a second subset of layers configured to provide protection for the first set of layers, each layer having a refractive index and a thickness. The total thickness of the second subset of layers is dimensioned so that the total thickness of the arrangement of layers is equal to m times a wavelength of the range divided by twice the equivalent refractive index of the first subset of layers and of the second subset of layers, times the cosine of a refracted angle corresponding to the angle of incidence of the radar waves, where m is an integer.

15 Claims, 2 Drawing Sheets

(58) Field of Classification Search
CPC ............ G01S 2013/93277; F21V 5/008; F21S 43/26211; B60Q 9/004; B60Q 9/006
See application file for complete search history.

(56) References Cited

U.S. PATENT DOCUMENTS

| | | | |
|---|---|---|---|
| 2017/0168137 A1* | 6/2017 | Cho ...................... | G01S 13/931 |
| 2018/0115059 A1* | 4/2018 | Tokunaga .............. | H01Q 1/422 |
| 2019/0356046 A1* | 11/2019 | Mayer Pujadas .... | B60Q 1/0011 |
| 2020/0124702 A1* | 4/2020 | Fukui ...................... | H01Q 1/42 |

* cited by examiner

VEHICLE ASSEMBLY COMPRISING A RADAR SENSOR AND AN ARRANGEMENT OF LAYERS FORMING A LOGO

TECHNICAL FIELD

The present invention relates to a vehicle assembly. It has a particular but non-limiting application in motor vehicles

BACKGROUND OF THE INVENTION

A vehicle assembly comprises, in a manner known to a person skilled in the art:
a radar sensor configured to emit radar waves; and—an arrangement of layers disposed facing said radar sensor.

The arrangement of layers forms an illuminated logo. The radar sensor is thus disposed behind the illuminated logo and meets the requirements for detecting an object in the external environment of the vehicle.

A disadvantage of this prior art is that when a radar wave is emitted by the radar sensor, it travels to the arrangement of layers and reflects on the arrangement of layers. This generates two reflected waves, one of which has been reflected on the outer face of the arrangement of layers and the other one of which has been reflected inside the arrangement of layers. The two reflected waves are reflected waves referred to as first order reflected waves that return to the radar sensor. This hinders the propagation of the radar waves. This reduces the signal-to-noise ratio of said radar sensor and thus causes disturbances relative to the detection by the radar sensor. The radar sensor loses detection range. Consequently, this can lead to a detection error or to the lack of detection of an object even when said object is present in the external environment of the vehicle.

Within this context, the aim of the present invention is to propose a vehicle assembly that allows the aforementioned disadvantage to be addressed.

SUMMARY OF THE INVENTION

To this end, the invention proposes a vehicle assembly for a vehicle, said vehicle assembly comprising:
a radar sensor configured to emit radar waves over a range of wavelengths; and
an arrangement of layers disposed facing said radar sensor, comprising a first subset of layers configured to perform an optical function, with each layer having a refractive index and a thickness, and a second subset of layers configured to provide protection for said first set of layers, with each layer having a refractive index and a thickness;
characterized in that the total thickness of the second subset of layers is dimensioned so that the total thickness of the arrangement of layers is equal to m times a wavelength of said range divided by twice the equivalent refractive index of the first subset of layers and of the second subset of layers, times the cosine of a refracted angle corresponding to the angle of incidence of the radar waves, where m is an integer.

According to non-limiting embodiments, said vehicle assembly can further comprise, alone or in any technically possible combination, one or more additional features selected from among the following.

According to one non-limiting embodiment, said radar sensor is a millimeter wave or a hyperfrequency wave or a microwave radar sensor.

According to one non-limiting embodiment, said radar waves are emitted over a frequency band ranging between 100 MHz and 5 GHz.

According to one non-limiting embodiment, if the angle of incidence is equal to zero, then the total thickness of the second subset of layers is dimensioned so that the total thickness of the arrangement of layers is equal to said wavelength divided by twice the equivalent refractive index of the first subset of layers and of the second subset of layers.

According to one non-limiting embodiment, the total thickness is defined with an angle of incidence equal to arctan $(d1/(2e4))$, with e4 being the distance between said radar sensor and said arrangement of layers and d1 being the distance between an emitter antenna and receiver antennas of said radar sensor.

According to one non-limiting embodiment, the second subset of layers comprises an output layer and a protective layer. The protective layer is an anti-ultraviolet and/or an anti-scratch layer.

According to one non-limiting embodiment, said output layer has a refractive index that has a difference with an equivalent refractive index of the first subset of layers of less than 0.1.

According to one non-limiting embodiment, said output layer has a refractive index that has a difference with an equivalent refractive index of the first subset of layers of less than 0.05.

According to one non-limiting embodiment, each layer of the first subset has a refractive index that has a difference with the refractive index of an adjacent layer of less than 0.1.

According to one non-limiting embodiment, each layer of the first subset has a refractive index that has a difference with the refractive index of an adjacent layer of less than 0.05.

According to one non-limiting embodiment, the first subset of layers comprises:
a film layer; —a scattering layer; —a reflective layer; and an opaque layer.

According to one non-limiting embodiment, the arrangement of layers forms a non-illuminated logo.

According to one non-limiting embodiment, the arrangement of layers forms an illuminated logo.

According to one non-limiting embodiment, the first subset of layers further comprises an optical layer.

According to one non-limiting embodiment, the first subset of layers further comprises:
another opaque layer;
another reflective layer.

According to one non-limiting embodiment, the first subset of layers further comprises a protective layer.

An arrangement of layers is also proposed disposed facing a radar sensor, said radar sensor being configured to emit radar waves over a range of wavelengths, said arrangement of layers comprising a first subset of layers configured to perform an optical function, with each layer having a refractive index and a thickness, and a second subset of layers configured to provide protection for the first set of layers, with each layer having a refractive index and a thickness; —characterized in that the total thickness of the second subset of layers is dimensioned so that the total thickness of the arrangement of layers is equal to m times a wavelength of said range divided by twice the equivalent refractive index of the first subset of layers and of the second subset of layers, times the cosine of a refracted angle corresponding to the angle of incidence of the radar waves, where m is an integer.

BRIEF DESCRIPTION OF DRAWINGS

The invention and its various applications will be better understood upon reading the following description and with reference to its accompanying figures, in which.

DETAILED DESCRIPTION OF THE INVENTION

The identical elements, by structure or by function, that appear in the various figures use the same reference signs, unless otherwise specified.

The vehicle assembly 1 of a vehicle 2 according to the invention is described with reference to FIGS. 1 to 3. The vehicle assembly 1 is also called a vehicle system 1. In one non-limiting embodiment, the vehicle 2 is a motor vehicle. A motor vehicle is understood to mean any type of motorized vehicle. This embodiment is taken as a non-limiting example throughout the remainder of the description. Throughout the remainder of the description, the vehicle 2 is thus also called a motor vehicle 2. In one non-limiting embodiment, the vehicle assembly 1 is disposed in the grille of the motor vehicle 2. In another non-limiting embodiment, the vehicle assembly 1 can be integrated into a bodywork part located at the rear of the motor vehicle 2.

Figure 1:
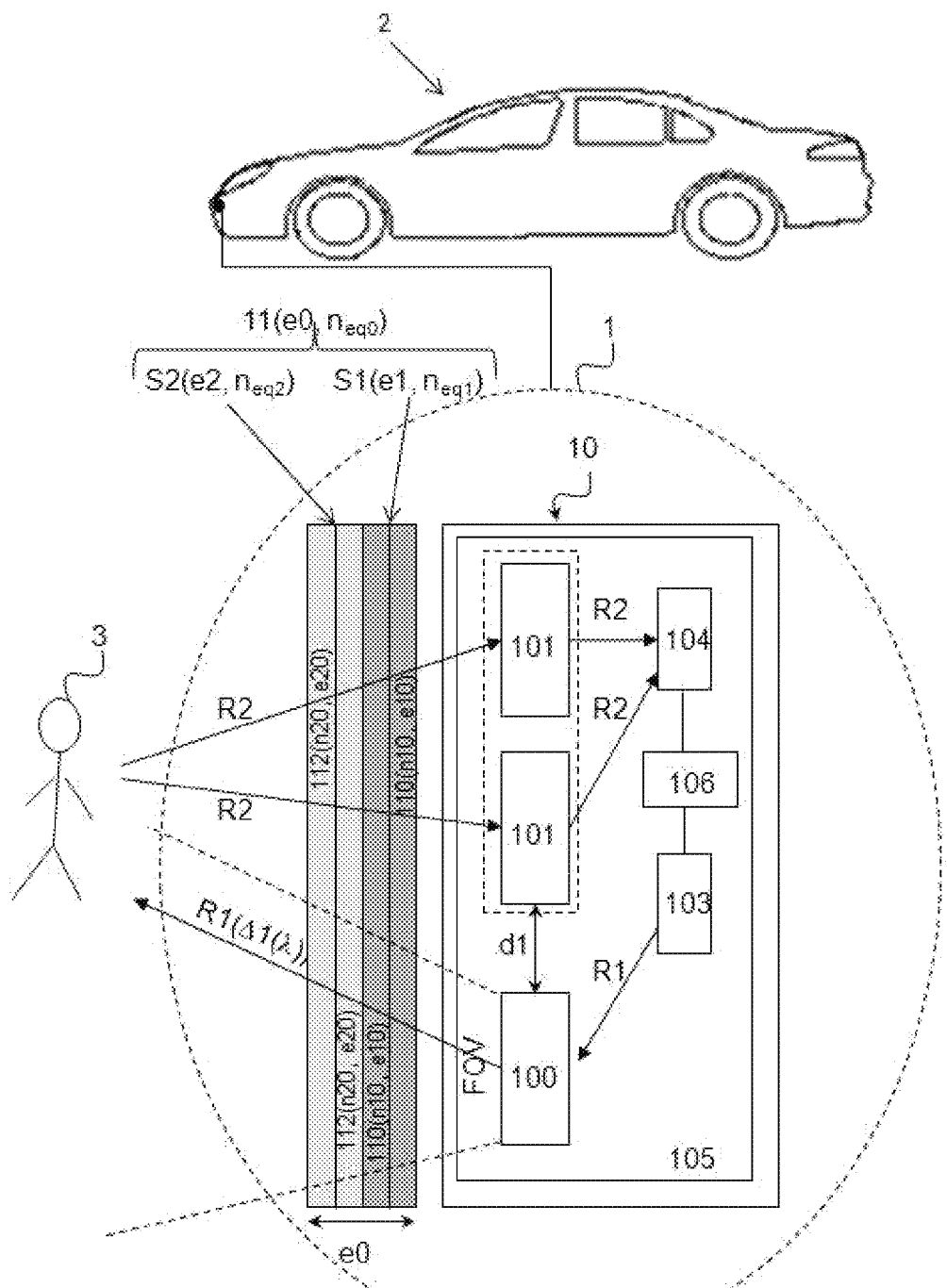
FIG. 1 is a schematic view of a vehicle assembly, with said vehicle assembly comprising a radar sensor and an arrangement of layers, according to one non-limiting embodiment of the invention.

As illustrated in FIG. 1, the vehicle assembly 1, also called the vehicle arrangement 1, comprises: —a radar sensor 10 configured to emit radar waves R1; and—an arrangement of layers 11 disposed facing said radar sensor 10.

These elements are described hereafter.

The radar sensor 10 is described hereafter. As illustrated in FIG. 1, the radar sensor 10 is disposed facing the arrangement of layers 11. In one non-limiting embodiment, the radar sensor 10 is a millimeter wave (between 24 GHz and 300 GHz) or a hyperfrequency wave (between 300 MHz and 81 GHz) or a microwave (between 1 GHz and 300 GHz) radar sensor. In one non-limiting alternative embodiment, the radar sensor 10 operates at a radar frequency ranging between 76 GHz and 81 GHz. The radar waves R1 are emitted over a range M. of wavelengths A. In one non-limiting embodiment, the radar waves R1 are emitted over a frequency band ranging between 100 MHz and 5 GHz. Thus, in one non-limiting example, if the sensor operates at a radar frequency of 77 GHz, that is a wavelength A of 3.95 mm, with a frequency band of 1 GHz, the radar sensor 10 will operate over a frequency band of 76.5 GHz to 775 GHz. The radar waves R1 will thus be emitted over the frequency range 76.5 GHz to 77.5 GHz, that is a range M of wavelengths A of 3.87 mm to 392 mm. Thus, in another non-limiting example, if the radar sensor operates at a radar frequency of 78.5 GHz with a frequency band of 5 GHz, the radar sensor 10 will operate over a frequency band of 76 GHz to 81 GHz. The radar waves R1 will thus be emitted over the frequency range 76 GHZ to 81 GHz, that is a range M. of wavelengths λ of 3.701 mm to 3.945 mm.

Figure 2:
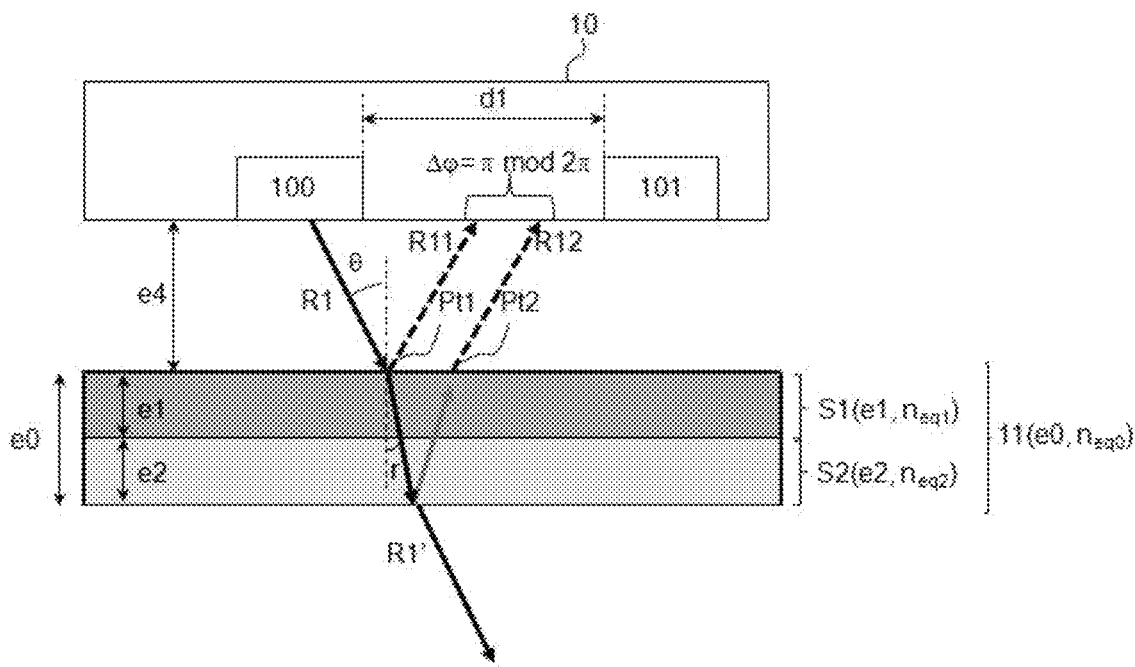
FIG. 2 is a schematic view of a radar wave emitted by the radar sensor of the vehicle assembly of FIG. 1 that partially reflects on the arrangement of layers of the vehicle assembly of FIG. 1, according to one non-limiting embodiment.

As illustrated in FIG. 2, the emitted radar waves R1 arrive with an angle of incidence θ on the arrangement of layers 11. In one non-limiting embodiment, the angle of incidence θ ranges between 0° and +/−30°. Thus, the radar sensor 10 comprises a field of view FOV that thus varies between −30° and +30°. The center of the field of view FOV is at an angle of 0° relative to the longitudinal axis of the vehicle, also called the axis of the vehicle. In another non-limiting embodiment, the field of view FOV varies between −90° and +45°. The center of the field of view FOV is at an angle of −45° relative to the axis of the vehicle and the angle of incidence θ of the radar waves R1 on the arrangement of layers 11 remains close to 0° (with the vehicle assembly 1 then being positioned at approximately 45° to the axis of the vehicle).

The radar sensor 10 is configured to scan the external environment of the motor vehicle 2, by virtue of the emission of radar waves R1. As illustrated in FIG. 1, the radar sensor 10 thus comprises:

- at least one emitter antenna 100 configured to emit radar waves R1, also called primary radar waves R1;
- at least two receiver antennas 101 configured to receive radar waves R2, also called secondary radar waves R2 or return radar waves R2.

The radar sensor 10 further comprises at least one emitter 103 configured to generate the primary radar waves R1 and at least one receiver 104 configured to process the secondary radar waves R2 received in return. In one non-limiting embodiment, a single electronic component can be used for the two emission and reception functions. There will thus be one or more transceivers. Said emitter 103 generates primary radar waves R1 that are subsequently emitted by the emitter antenna 100, which waves, when they encounter an object 3 (in this case a pedestrian in the illustrated non-limiting example) in the external environment of the motor vehicle 2, reflect on said object 3. The radar waves that are thus reflected are waves that are emitted back to the radar sensor 10. These are the secondary radar waves R2 received by the receiver antennas 101. These are radar waves retransmitted toward the radar sensor 10. In one non-limiting embodiment, the primary radar waves R1 and the secondary radar waves R2 are radio-frequency waves. In one non-limiting embodiment, the radar sensor 10 comprises a plurality of emitters 103 and a plurality of receivers 104.

The emitter antenna 100, also called antenna 100, is configured to emit the primary radar waves R1 generated by the emitter 103. The receiver antennas 101, also called antennas 101, are configured to receive the secondary radar waves R2 and send them to the receiver 104, which subsequently processes them. A phase shift exists between the secondary radar waves R2 received by the receiver antennas 101 that allows the angular position of the object 3 relative to the motor vehicle 2 to be deduced therefrom, which object 3 is located in the external environment of the motor vehicle 2. In non-limiting embodiments, the antennas 100, 101 are patch antennas or slot antennas.

In one non-limiting embodiment, the antennas 100, 101, the emitter 103 and the receiver 104 are disposed on a printed circuit board 105. In one non-limiting embodiment, the printed circuit board is a rigid printed circuit board, also called PCBA (Printed Circuit Board Assembly) or a flexible printed circuit board, also called "Flexboard".

The radar sensor 10 further comprises an electronic control unit 106 configured to control the emitter 103 and the receiver 104. Since a radar sensor is known to a person skilled in the art, it is not described in more detail herein.

The arrangement of layers 11 is described hereafter. As illustrated in FIG. 1 or FIG. 3, it comprises:
- a first subset S1 of layers 110 configured to perform an optical function; and
- a second subset S2 of layers 112 configured to provide protection for said first set S1 of layers 110.

It should be noted that since FIG. 1 is a schematic view, only two layers 110 have been illustrated in FIG. 1. Throughout the remainder of the description, the first subset S1 of layers 110 is also called first subset S1, and the second subset S2 of layers 112 is also called second subset S2. In non-limiting embodiments, the arrangement of layers 11 forms an illuminated logo or a non-illuminated logo. In the case of an illuminated logo, the vehicle assembly 1 comprises one or more light sources 12. The non-limiting embodiment of an illuminated logo is taken as an example throughout the remainder of the description.

Figure 3:
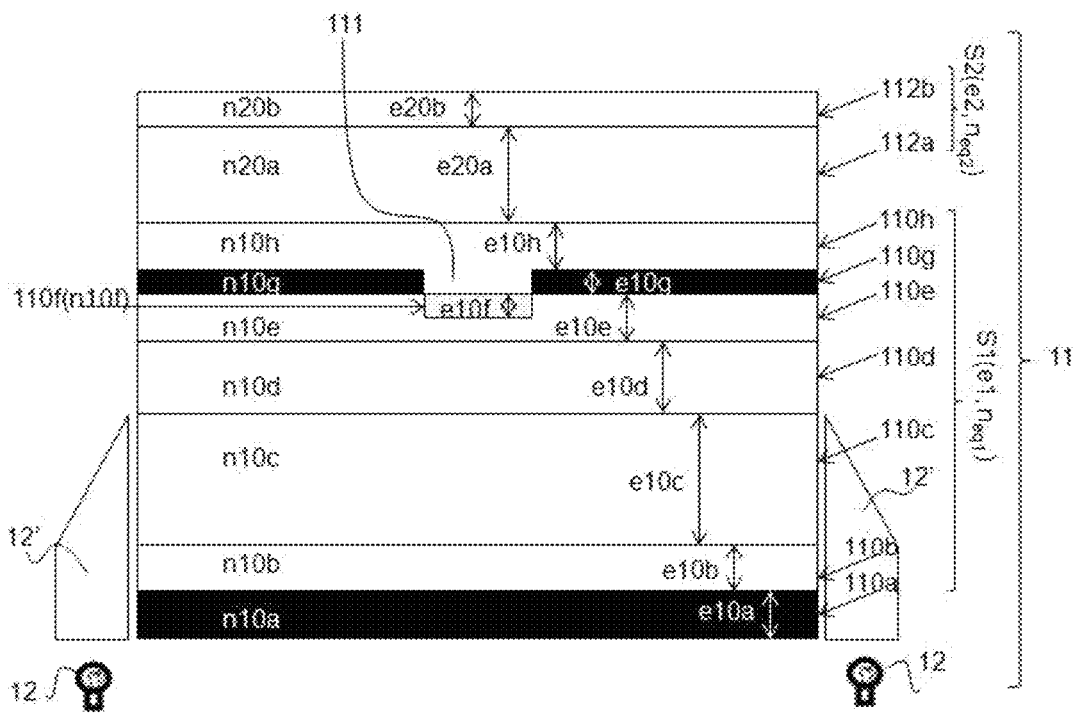
FIG. 3 is a schematic view of the layers of the arrangement of layers of the vehicle assembly of FIG. 1, with said arrangement of layers comprising a first subset of layers and a second subset of layers, according to one non-limiting embodiment.

Indeed, as illustrated in FIG. 3, in one non-limiting embodiment, the logo is illuminated by two light sources 12. In the illustrated non-limiting example, the light sources 12 are disposed on the sides of the first subset S1 of layers 110. An optical device 12' with total reflection allows the light emitted by the light sources 12 to be injected inside a layer 110c that is described hereafter. In one non-limiting embodiment, the light sources 12 are semi-conductor light sources. In one non-limiting embodiment, the semi-conductor light sources form part of a light emitting diode. A light-emitting diode is understood to mean any type of light-emitting diodes, whether in non-limiting examples of LEDs, OLEDs (Organic LEDs), AMOLEDs (Active-Matrix-Organic LED), or even FOLEDs (Flexible OLEDs). In another non-limiting embodiment, the light sources 12 are a bulb with a filament.

As illustrated in FIG. 1, the first subset S1 of layers 110 is disposed facing the radar sensor 10, while the second subset S2 of layers 112 is adjacent to the first subset S1 of layers 110 and is disposed facing the outside of the motor vehicle 2.

As illustrated in FIG. 3, each layer 110 of the first subset S1 has a refractive index n10 and a thickness e10. The first subset S1 has a total thickness e1 made up of all the thicknesses e11). Each layer 112 of the second subset S2 has a refractive index n20 and a thickness e20. The second subset S2 comprises a total thickness e2 made up of all the thicknesses e20. The arrangement of layers 11 thus comprises a total thickness e0=e1+e2.

In one non-limiting embodiment, the first subset S1 of layers 110 comprises an optical layer 110c. The optical layer 110c is facing the radar sensor 10. The optical layer 110c allows the light rays from the light sources 12 to be emitted. The optical layer 110c is a layer transparent both to the radar waves R1, R2 and to the visible light. In non-limiting embodiments, the optical layer 110c can be a light guide or a lens with prisms.

As illustrated in FIG. 3, in one non-limiting embodiment, the first subset S1 of layers 110 comprises the following successive layers 110:
the optical layer 110c; —a film layer 110d; —a scattering layer 110e; —a reflective layer 110f; —an opaque layer 110g.

All the layers 110 except the reflective layer 110f are dielectric layers, which allows them to be transparent to the radar waves R1, R2. The reflective layer 110f is more absorbent, but is very thin, which allows the radar waves R1 to pass through it as well. In one non-limiting embodiment, the reflective layer 110f is made of indium. In non-limiting embodiments, a dielectric layer is formed by a plastic, glass or ceramic material. In one non-limiting example, the plastic is polycarbonate (PC). By way of a reminder, a dielectric material is non-conductive and therefore allows through the radar waves R1, unlike a conductive material.

In this non-limiting embodiment, the optical layer 110c acts as a support for the film layer 110d. The film layer 110d is disposed between the optical layer 110c and the reflective layer 110f. In a non-limiting example, the film layer 110d is made of PC-IML (Polycarbonate In-Mold Labeling).

The scattering layer 110e is disposed between the film layer 110d and the opaque layer 110g. The scattering layer 110e allows a secondary source to be created that is located in the vicinity of said scattering layer 110e. This thus allows the design of the illuminated logo to be perceived at the site of said scattering layer 110e. In one non-limiting embodiment, the scattering layer 110e is disposed facing the opening 111 made in the opaque layer 110g. The opening 111 allows the design of the logo to be produced.

The opaque layer 110g is disposed facing the second set S2 of layers 112. The opaque layer 110g allows a well defined zone to be masked and illuminated. It allows a pattern to be produced for the illuminated logo.

The reflective layer 110f allows a metallic appearance to be provided in visible light when the logo is observed from the outside. The reflective layer 110f can extend under the entire opaque layer 110g.

As illustrated in FIG. 3, in one non-limiting embodiment, the first subset S1 of layers 110 further comprises:
another opaque layer 110a; —another reflective layer 110b.

This other opaque layer 110a, when it exists, is disposed facing the radar sensor 10 and is adjacent to this other reflective layer 110b. It prevents light leakage behind the illuminated logo that would be seen from outside the motor vehicle 2. It absorbs the light from the light sources 12.

This other reflective layer 110b, when it exists, is disposed between the opaque layer 110a and the optical layer 110c. In one non-limiting embodiment, this other reflective layer 110b is white paint. It allows the light rays emitted by the light sources 12 to reflect toward the center of the arrangement of layers 11.

As illustrated in FIG. 3, in one non-limiting embodiment, the first subset S1 of layers 110 further comprises a protective layer 110h for preventing oxidation of the other layers 110, in particular of the reflective layer 110f. This protective layer 110h is disposed between the opaque layer 110g and the second set S2 of layers 112.

In one non-limiting embodiment, the second subset S2 of layers 112 comprises an output layer 112a that forms an output outer lens of the illuminated logo, and a protective layer 112b that prevents yellowing of the plastic of the output outer lens 112a in particular and also of the protective layer 110h, by stopping ultraviolet. In one non-limiting embodiment, the protective layer 112b also can be an anti-scratch layer. In one non-limiting embodiment, the output layer 112a is made of PC. It is a layer that is transparent both to the radar waves R1, R2 and to visible light. In one non-limiting embodiment, the protective layer 112b has a thickness e20b of 50 micrometers. In one non-limiting embodiment, the protective layer 112b is a deposit of a protective varnish.

It should be noted that it is possible to consider that the set of layers 110 of the first subset S1 is equivalent to a single equivalent layer of total thickness e 1 with an equivalent refractive index neq1 when the layers 110 each have a refractive index n10 that is very close to the refractive index n10 of another adjacent layer 110, in other words contiguous. Thus, in one non-limiting embodiment, each layer 110 has a refractive index n10 that has a difference with the refractive index n10 of an adjacent layer 110 of less than 0.1. This threshold also allows the internal reflected waves between the layers 110 of the first subset S1 to be rendered negligible. In one non-limiting alternative embodiment of this non-limiting embodiment, the difference is less than 0.05.

Similarly, it should be noted that it is possible to consider that the set of layers 112 of the second subset S2 is equivalent to a single equivalent layer of total thickness e2 with an equivalent refractive index neq2 when the layers 112 each have a refractive index n20 that is very close to the refractive index n20 of an adjacent layer 112, in other words contiguous. Thus, in one non-limiting embodiment, each layer 112 has a refractive index n20 that has a difference with the refractive index n20 of an adjacent layer 112 of less than 0.1. This threshold also allows the internal reflected waves between the layers 112 of the second subset S2 to be rendered negligible. In other words, the output layer 112a has a refractive index n20a that has a difference with the refractive index n20b of the protective layer 112b adjacent to it of less than 0.1. In one non-limiting alternative embodiment of this non-limiting embodiment, the difference is less than 0.05.

The first subset S1 has an equivalent refractive index neq1. In order to compute the equivalent refractive index $n_{eq1}$, it is computed step-by-step. Thus, the equivalent refractive index $n_{eqa}$ for the two first adjacent layers 110a, 110b, is computed first, that is:

$$n_{eqa} = \frac{n_{10a}n_{10b}(e_{10a} + e_{10b})}{n_{10b}e_{10a} + n_{10a}e_{10b}} = \frac{n_{10a}n_{10b}\left(1 + \frac{e_{10b}}{e_{10a}}\right)}{n_{10b} + n_{10a}\left(\frac{e_{10b}}{e_{10a}}\right)} \quad \text{Math 1}$$

The two layers 110a and 110b are thus replaced with a single layer of total thickness $e_a = e10a + e10b$ identical to the two layers. The equivalent refractive index is then computed between this obtained layer of equivalent index $n_{eqa}$ and the next adjacent layer, namely 110c in this case, and so on.

Thus, the first subset S1 has an equivalent refractive index $n_{eq1}$ equal to:

$$n_{eq1} = \frac{n_{eqe}n_{10h}(e_e + e_{10h})}{n_{10h}e_e + n_{eqe}e_{10h}} = \frac{n_{eqe}n_{10h}\left(1 + \frac{e_{10h}}{e_e}\right)}{n_{10h} + n_{eqe}\left(\frac{e_{10h}}{e_e}\right)} \quad \text{Math 2}$$

With $e_c$ being the total thickness of layers 110a to 110g, and $n_{eqe}$ being the equivalent index of layers 110a to 110g.

The second subset S2 has an equivalent refractive index neq2 equal to:

$$n_{eq1} = \frac{n_{eqe}n_{10h}(e_e + e_{10h})}{n_{10h}e_e + n_{eqe}e_{10h}} = \frac{n_{eqe}n_{10h}\left(1 + \frac{e_{10h}}{e_e}\right)}{n_{10h} + n_{eqe}\left(\frac{e_{10h}}{e_e}\right)} \quad \text{Math 3}$$

The equivalent refractive index neq0 of the first subset S1 and of the second subset S2 is therefore obtained:

$$n_{eq0} = \frac{n_{eq1}n_{eq2}(e_1 + e_2)}{n_{eq2}e_1 + n_{eq}e_2} = \frac{n_{eq1}n_{eq2}\left(1 + \frac{e_2}{e_1}\right)}{n_{eq2} + n_{eq}\left(\frac{e_2}{e_1}\right)} \quad \text{Math 4}$$

It should be noted that a refractive index n can be computed from the permittivity of a layer. Since this computation is known to a person skilled in the art, it is not described herein.

As illustrated in FIG. 2, when a radar wave R1 is emitted by the radar sensor 10, it travels up to the arrangement of layers 11 that has an equivalent refractive index neq0, and a total thickness e0.

The radar wave R1 is reflected onto the arrangement of layers 11 and generates two reflected waves, one R11 of which has been reflected onto the outer face of the first subset S1 and the other one of which has been reflected inside the arrangement of layers 11. The two reflected waves R11 and R12 are reflected waves, called first order reflected waves, that return to the radar sensor 10. These are parasitic reflections. When the angle of incidence θ differs from 0°, the corresponding refracted angle r also differs from 0°.

The phase difference Δφ, also called the phase shift Δφ, between these two reflected waves R11 and R12 is equal to:

$$\Delta\varphi = \frac{n_{eq}\delta}{\lambda} + \pi - \frac{2e0t(r)\sin(\theta)}{\lambda} \quad \text{Math 5}$$

with:
  $n_{eq}$ being the total equivalent refractive index for the first subsets S1 and the second subset S2;
  δ being the path of the reflected wave R12 in the material equal to 2e0/cos(r);
  nδ/λ being the phase shift due to the path through the material;
  π being the phase shift due to the internal reflection in the first subset S1 and the second subset S2;
  ((2e0 tan(r) sin(θ))/λ) being the phase shift in the air due to the difference between the reflection point Pt1 of the reflected wave R11 and the emergence point Pt2 of the reflected wave R12.

As sin(θ)=neq0×sin(r), the following is obtained:

$$\frac{-2e0\tan(r)\sin(\theta)}{\lambda} = \frac{-2e0n_{eq0}\sin(r)^2}{\lambda\cos(r)} \quad \text{Math 6}$$

Namely:

$$\Delta\varphi = \pi + \frac{2n_{eq0}e0}{\lambda\cos(r)}(1 - \sin(r)^2) = \pi + \frac{2n_{eq0}e0\cos(r)}{\lambda} \quad \text{Math 7}$$

and this is the case irrespective of the value of the refracted angle r.

Since the reflected waves R11 and R12 return toward the radar sensor 10, they cause disturbances on the radar sensor 10, namely an attenuation of the signal-to-noise ratio. In order to eliminate these disturbances, the total thickness e0 of the arrangement of layers 11 will be defined so that the reflected waves R11 and R12 are in phase opposition in order to create destructive interference. In order to obtain destructive interference, the phase difference Δφ between the two reflected waves R11 and R12 must be equal to π modulo 2π. Thus, Δφ=(2m+1)*π, with m being a natural integer. Therefore, the following is obtained:

$$(2m+1)\pi = \pi + \frac{2n_{eq0}e0\cos(r)}{\lambda} \qquad \text{Math 8}$$

Namely:

Let e0=mλ/(2n$_{eq0}$ cos (r)).

It should be noted that the equation e0=mλ/(2n$_{eq}$ cos(r)) is applied irrespective of the value of the angle r. Thus, this total thickness e0 is dimensioned so that it is equal to m times a wavelength λ of said range Δ1, with the whole being divided by twice an equivalent refractive index neq0o of the first subset S1 of layers 110 and of the second subset S2 of layers 112, times the cosine of a refracted angle r corresponding to the angle of incidence θ of the radar waves R1, where m is an integer. Thus, from the total equivalent refractive index neq0 and the wavelength λ used over the operating frequency range of the radar sensor 10, the total thickness e0 of the arrangement of layers 11 can be determined so that said reflected waves R11 and R12 cancel each other out. In one non-limiting embodiment, the selected wavelength λ is that of the middle of said range Δ1.

An ideal total thickness e0 is defined when the angle of incidence is equal to 0; and m is equal to 1. When θ=0, r=0. Consequently, for m=1, the ideal total thickness e0 of the arrangement of layers 11 is therefore e0=λ/(2n$_{eq}$). When r=0°, then cos (r)=1.

The arrangement of layers 11 has a total thickness e0 formed by the total thickness e1 of the first subset S1 of layers 110 and by the total thickness e2 of the second subset S2 of layers 112. As it is preferable to avoid adjusting the total thickness e1 so as to avoid modifying the optical performance of the illuminated logo, the total thickness e2 will be adapted in order to obtain ideal e0=/(2n$_{eq0}$) when θ=0 or in order to obtain e0=m λ/(2n$_{eq0}$ cos (r)) when θ≠0. Adjusting the total thickness e2 does not modify the optical performance of the illuminated logo. It should be noted that in the case of a non-illuminated logo, it is also possible to adjust the total thickness e1, in particular by modifying the thickness e10d of the film layer 110d.

Thus, the total thickness e2 of the second subset of layers 112 is dimensioned so that the total thickness e0 of the arrangement of layers 11 is equal to said wavelength λ divided by twice the equivalent refractive index neq0 of the first subset S1 of layers 110 and of the second subset S2 of layers 112, for an angle of incidence θ equal to zero. If the angle of incidence θ differs from zero, e0=mλ/(2n$_{eq0}$ cos (r)) is obtained. This equation is applied irrespective of the value of the refraction angle r. It should be noted that, in practice, the thickness e20a of the output layer 112a will be adjusted. Indeed, since the protective layer 112b is already very thin, its thickness e20b cannot be adjusted.

In one non-limiting embodiment, the arrangement of layers 11 has a total thickness e0 that ranges between 0.8 and 1.2 times said ideal total thickness e0. This range of values takes into account the possible emission angles of the radar sensor 10. The possible values of the angle of incidence θ are defined in the technical specifications of the radar sensor 10, which means that the possible values of the angle of incidence θ are in the field of view of the radar sensor 10. In one non-limiting example, the angle of incidence θ ranges between 0° and +/−30°. This range of values from 0.8 to 1.2 allows the manufacturing tolerances of the total thickness e0 to be taken into account.

It should be noted that the values of the angle of incidence θ are included in the possible angles of emission of the radar sensor 10. The possible values of the angle of incidence θ are defined in the technical specifications of the radar sensor 10. It should be noted that a value of the angle of incidence 0 exists for which the reflected radar waves R11 and R12 cause a maximum disturbance of the receiver antennas 101 of the radar sensor 10. This angle of incidence θ is called the critical angle of incidence θ. In one non-limiting embodiment, this value is equal to θ=arctan (d1/(2e4)), with d1 being the distance between the emitter antenna 100 and the receiver antennas 101, e4 being the distance between the radar sensor 10 and the arrangement of layers 11 as illustrated in FIG. 2. Thus, the value of the total thickness e0 is determined for an angle of incidence θ equal to arctan(d1/(2e4)). It should be noted that, in one non-limiting example, the midpoint of the receiver antennas 101 is taken in order to compute d1.

Thus, depending on the value of the total equivalent refractive index neq0 and of the wavelength λ used over the operating frequency range of the radar sensor 10 (between 76 GHz to 81 GHz in the non-limiting example used), it is possible to determine the value of the total thickness e0, more specifically the value of the total thickness e2 of the second subset s2, so that the first order reflected waves R11 and R12 cancel each other out. Thus, the receiver antennas 101 experience less noise. A better signal-to-noise ratio is achieved.

It should be noted that, in order to avoid having internal reflected waves between the output layer 112a and the first subset S1 of layers 110, in one non-limiting embodiment, the output layer 112a has a refractive index n20a that has a difference with an equivalent refractive index$_{neq1}$ of the first subset S1 of layers 110 of less than 0.1. In one non-limiting alternative embodiment, the difference is less than 0.05.

Of course, the description of the invention is not limited to the embodiments described above and to the field described above. Thus, in another non-limiting embodiment, the radar sensor 10 comprises more than one emitter antenna 100 and more than two receiver antennas 101. Thus, in another non-limiting embodiment, the light sources 12 are integrated into a cavity of the layer 110c. Thus, in the non-limiting embodiment of a non-illuminated logo, the first subset S1 does not comprise the layers 110a to 110c and optionally 110d.

Thus, the invention described particularly has the following advantages:
  it allows the first order reflected waves R11, R12 to be eliminated that reflect toward the radar sensor 10. The signal-to-noise ratio of said radar sensor 10 is thus no longer low. The emission of the radar waves R1 is improved;
  it allows only the total thickness e2 (in particular the thickness e20a of the output layer 112a) of the second subset S2 to be adjusted without having to change the total thickness e1 of the first subset S1 so that the optical performance of the illuminated logo is not modified.

What is claimed is:

1. A vehicle assembly for a vehicle, the vehicle assembly comprising:
  a radar sensor configured to emit radar waves over a range of wavelengths; and an arrangement of layers disposed facing the radar sensor, comprising including a first subset of layers configured to perform an optical function, each layer layer having a refractive index and a thickness, and a second subset of layers configured to provide protection for the first set of layers, each layer having a refractive index and a thickness;

wherein a total thickness of the second subset of layers is dimensioned so that a total thickness of the arrangement of layers is equal to m times a wavelength of the range divided by twice the equivalent refractive index of the first subset of layers and of the second subset of layers, times the cosine of a refracted angle corresponding to the angle of incidence of the radar waves, where m is an integer.

2. The vehicle assembly as claimed in claim 1, wherein the radar sensor is a millimeter wave or a hyperfrequency wave or a microwave radar sensor.

3. The vehicle assembly as claimed in the preceding claim 1, wherein the radar waves are emitted over a frequency band ranging between 100 MHz and 5 GHz.

4. The vehicle assembly as claimed in claim 1, wherein, if the angle of incidence is equal to zero, then the total thickness of the second subset of layers is dimensioned so that the total thickness of the arrangement of layers is equal to the wavelength divided by twice the equivalent refractive index of the first subset of layers and of the second subset of layers.

5. The vehicle assembly as claimed in claim 1, wherein the total thickness is defined with an angle of incidence equal to arctan (d1/(2e4), with e4 being the distance between the radar sensor and the arrangement of layers and d1 being the distance between an emitter antenna and receiver antennas of the radar sensor.

6. The vehicle assembly as claimed in claim 1, wherein the second subset of layers includes an output layer and a protective layer.

7. The vehicle assembly as claimed in the preceding claim 6, wherein the output layer has a refractive index that has a difference with an equivalent refractive index of the first subset of layers of less than 0.1.

8. The vehicle assembly as claimed in the preceding claim 6, wherein the output layer has a refractive index that has a difference with an equivalent refractive index of the first subset of layers of less than 0.05.

9. The vehicle assembly as claimed in claim 1, wherein each layer of the first subset has a refractive index that has a difference with the refractive index of an adjacent layer of less than 0.1.

10. The vehicle assembly as claimed in claim 1, wherein each layer of the first subset has a refractive index that has a difference with the refractive index of an adjacent layer of less than 0.05.

11. The vehicle assembly as claimed in claim 1, wherein the first subset of layers includes:
a film layer;
a scattering layer;
a reflective layer; and
an opaque layer.

12. The vehicle assembly as claimed in claim 1, wherein the arrangement of layers forms an illuminated logo.

13. The vehicle assembly as claimed in claim 11, wherein the first subset of layers further includes an optical layer.

14. The vehicle assembly as claimed in claim 1, wherein the arrangement of layers forms a non-illuminated logo.

15. An arrangement of layers disposed facing a radar sensor, the radar sensor being configured to emit radar waves over a range of wavelengths, the arrangement of layers comprising a first subset of layers configured to perform an optical function, each layer having a refractive index and a thickness, and a second subset of layers configured to provide protection for the first set of layers, each layer having a refractive index and a thickness;

wherein a total thickness of the second subset of layers is dimensioned so that a total thickness of the arrangement of layers is equal to m times a wavelength of the range divided by twice the equivalent refractive index of the first subset of layers and of the second subset of layers, times the cosine of a refracted angle corresponding to the angle of incidence of the radar waves, where m is an integer.

* * * * *